US010506112B2

(12) United States Patent
Kai et al.

(10) Patent No.: US 10,506,112 B2
(45) Date of Patent: Dec. 10, 2019

(54) IMAGE READING DEVICE STORING BARCODE TYPES AND ASSOCIATED DESIGNATION INFORMATION AND IMAGE READING METHOD

(71) Applicant: KYOCERA Document Solutions Inc., Osaka (JP)

(72) Inventors: Hiroko Kai, Osaka (JP); Sachiko Shintani, Osaka (JP); Makiko Sato, Osaka (JP); Hironori Hayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/259,111

(22) Filed: Jan. 28, 2019

(65) Prior Publication Data

US 2019/0238692 A1 Aug. 1, 2019

(30) Foreign Application Priority Data

Jan. 29, 2018 (JP) .................................. 2018-012440

(51) Int. Cl.
*H04N 1/00* (2006.01)
*H04N 1/333* (2006.01)

(52) U.S. Cl.
CPC ..... *H04N 1/00334* (2013.01); *H04N 1/00214* (2013.01); *H04N 1/33315* (2013.01)

(58) Field of Classification Search
None
See application file for complete search history.

(56) References Cited

U.S. PATENT DOCUMENTS

| 2011/0101085 A1* | 5/2011 | Nakagawa | G06F 16/34 235/375 |
| 2011/0293135 A1* | 12/2011 | Irons | H04N 1/2166 382/101 |
| 2013/0153662 A1* | 6/2013 | Narasa Prakash | G06K 7/1486 235/462.07 |

FOREIGN PATENT DOCUMENTS

JP 2005107690 A 4/2005

* cited by examiner

*Primary Examiner* — Andrew H Lam
(74) *Attorney, Agent, or Firm* — Studebaker & Brackett PC

(57) ABSTRACT

An image reading device includes storage, an image reading section, a receiving section, a display section, and a controller. The storage stores therein a plurality of barcode types and designation information items each associated with any of the barcode types. The image reading section acquires a read image by reading a document image including a barcode image. The receiving section receives input of a designation information item among the designation information items. The display section displays one or more barcode types among the barcode types. The controller controls the storage, the receiving section, and the display section. The barcode image exhibits a barcode belonging to any of the one or more barcode types. The controller causes the display section to display the one or more barcode types on the basis of the designation information item received by the receiving section and associated with the one or more barcode types.

17 Claims, 12 Drawing Sheets

| Type | Transmission destination |
|---|---|
| CODE128 | AAA@aaa.com |
| CODE39 | BBB@bbb.com |
| NW-7 | CCC@ccc.com |
| CODE128 | AAA@aaa.com |
| CODE128 | AAA@aaa.com |
| ⋮ | ⋮ |
| CODE39 | AAA@aaa.com |

FIG. 3

| Type | Department |
|---|---|
| CODE128 | Department A |
| CODE39 | Department B |
| NW-7 | Department C |
| CODE128 | Department A |
| CODE128 | Department A |
| ⋮ | ⋮ |
| CODE39 | Department A |

FIG. 6

| Type | Size |
|------|------|
| CODE128 | Size A |
| CODE39 | Size B |
| NW-7 | Size C |
| CODE128 | Size A |
| CODE128 | Size A |
| ⋮ | ⋮ |
| CODE39 | Size A |

FIG. 8

| Type | Set count |
|---|---|
| CODE128 | 35 |
| CODE39 | 20 |
| NW-7 | 10 |
| ⋮ | ⋮ |
| JAN | 5 |

FIG. 10

| Type | Digit number |
|---|---|
| CODE128 | 12 |
| | 13 |
| | 14 |
| CODE39 | 14 |
| | 15 |
| | 16 |
| NW-7 | 7 |
| | 8 |
| | 9 |
| ⋮ | ⋮ |
| JAN | 8 |
| | 13 |

IMAGE READING DEVICE STORING BARCODE TYPES AND ASSOCIATED DESIGNATION INFORMATION AND IMAGE READING METHOD

INCORPORATION BY REFERENCE

The present application claims priority under 35 U.S.C. § 119 to Japanese Patent Application No. 2018-012440, filed on Jan. 29, 2018. The contents of this application are incorporated herein by reference in their entirety.

BACKGROUND

The present disclosure relates to an image reading device and an image reading method.

A document management device generates document image information by reading a document image including a barcode image exhibiting a barcode. The document management device then extracts barcode image information from the document image information. Next, the document management device acquires a document ID from the barcode image information by analyzing the barcode image information. Further, the document management device determines presence or absence of an electronic document corresponding to the acquired document ID.

SUMMARY

An image reading device according to an aspect of the present disclosure includes storage, an image reading section, a receiving section, a display section, and a controller. The storage stores therein a plurality of barcode types and designation information items. Each of the designation information items is associated with any of the plurality of barcode types. The image reading section acquires a read image by reading a document image including a barcode image. The receiving section receives input of a designation information item among the designation information items. The display section displays one or more barcode types among the plurality of barcode types. The controller controls the storage, the receiving section, and the display section. The barcode image exhibits a barcode belonging to any of the one or more barcode types. The controller causes the display section to display the one or more barcode types on the basis of the designation information item received by the receiving section. The one or more barcode types are associated with the designation information item.

An image reading method according to another aspect of the present disclosure includes storing, acquiring, receiving, and displaying. In the storing, a plurality of barcode types and designation information items are stored. Each of the designation information items is associated with any of the plurality of barcode types. In the acquiring, a read image is acquired by reading a document image including a barcode image. In the receiving, input of a designation information item among the designation information items is received. In the displaying, one or more barcode types among the plurality of barcode types are displayed on the basis of the received designation information item. The one or more barcode types are associated with the received designation information item. The barcode image exhibits a barcode belonging to any of the one or more barcode types.

BRIEF DESCRIPTION OF THE DRAWINGS

FIG. 3 is a diagram illustrating barcode types and transmission destination information stored in storage.

FIG. 6 is a diagram illustrating barcode types and department information stored in the storage.

FIG. 8 is a diagram illustrating barcode types and size information stored in the storage.

FIG. 10 is a diagram illustrating barcode types and set counts stored in the storage.

FIG. 11 is a diagram illustrating barcode types and barcode digit numbers stored in the storage.

DETAILED DESCRIPTION

Figure 1:
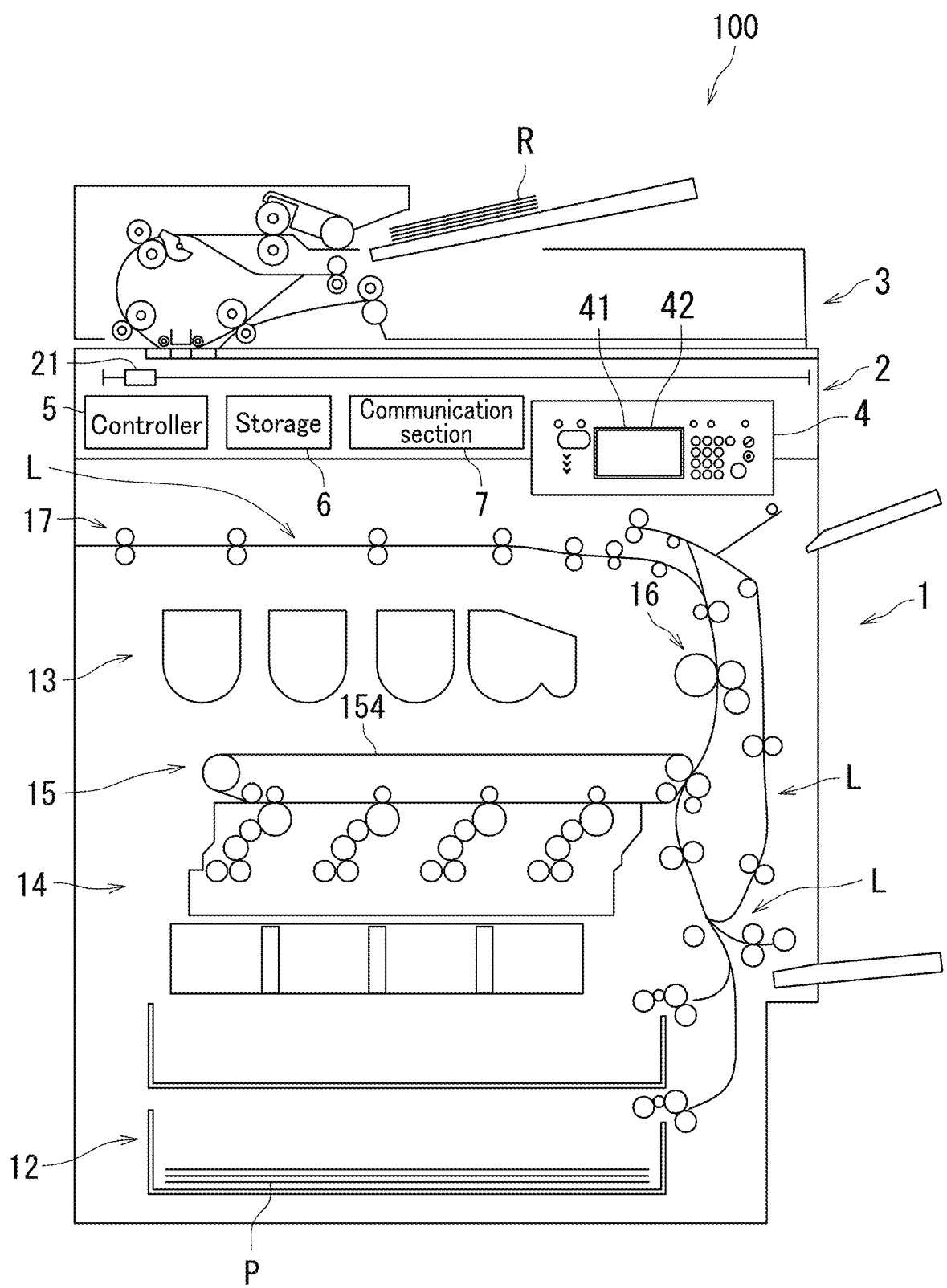
FIG. 1 is a diagram illustrating a configuration of an image forming apparatus.

The following describes embodiments of the present disclosure with reference to the accompanying drawings. Note that elements that are the same or equivalent are labelled using the same reference signs in the drawings, and description of those elements will not be repeated.

First Embodiment

The following describes a configuration of an image forming apparatus 100 according to the present embodiment with reference to FIG. 1. FIG. 1 is a diagram illustrating the configuration of the image forming apparatus 100. The image forming apparatus 100 is a color multifunction peripheral. The image forming apparatus 100 reads an image formed on a document R and forms an image on a sheet P with toner.

As illustrated in FIG. 1, the image forming apparatus 100 includes an image forming unit 1, an image reading unit 2, and a document conveyance unit 3. The forming unit 1 forms an image on the sheet P. The image reading unit 2 reads a document image formed on the document R and generates document image information. The document conveyance unit 3 conveys the document R to the image reading unit 2. The image reading unit 2 is equivalent to an example of what is referred to as an "image reading device".

The image forming unit 1 includes a feeding section 12, a conveyance section L, a toner supply section 13, an image forming section 14, a fixing section 16, and an ejection section 17. The image forming section 14 includes a transfer section 15.

The feeding section 12 feeds the sheet P to the conveyance section L. The conveyance section L conveys the sheet P to the ejection section 17 via the transfer section 15 and the fixing section 16.

The toner supply section 13 supplies toner to the image forming section 14. The image forming section 14 forms the image on the sheet P.

The transfer section 15 includes an intermediate transfer belt 154. The image forming section 14 transfers toner images in respective colors of cyan, magenta, yellow, and black onto the intermediate transfer belt 154. The toner images in the respective colors are superimposed on one another on the intermediate transfer belt 154. As a result, an image is formed on the intermediate transfer belt 154. The transfer section 15 transfers the image formed on the intermediate transfer belt 154 onto the sheet P. As a result, the image is formed on the sheet P.

The fixing section 16 applies heat and pressure to the sheet P, thereby fixing the image formed on the sheet P to the sheet P. The ejection section 17 ejects the sheet P out of the image forming apparatus 100.

The image reading unit 2 includes an image reading section 21, an operation panel 4, a controller 5, storage 6, and a communication section 7.

The image reading section 21 is a contact image sensor (CIS) unit, which is an integrated assembly of light emitting diodes (LEDs), contact glass, an imaging lens, and an image sensor. The image reading section 21 acquires a read image by reading an image including a barcode image.

The operation panel 4 includes a display section 41 and a receiving section 42. The display section 41 is a display capable of displaying a software button and having a touch panel function. The touch panel function enables the display section 41 to also function as the receiving section 42. The display section 41 displays an image.

The receiving section 42 for example has the touch panel function and includes various hardware buttons. The receiving section 42 receives input of designation information by a user. Examples of the designation information include transmission destination information, department information, and size information. The transmission destination information indicates a transmission destination of the read image. Examples of the transmission destination information include an email address and a facsimile number. The department information indicates a department to which the user using the image forming apparatus 100 belongs. The department information is identified on the basis of login information input by the user to use the image forming apparatus 100, for example. The size information indicates the size of the document image.

The controller 5 is a hardware circuit including a processor such as a central processing unit (CPU), an application specific integrated circuit (ASIC), and the like. The controller 5 controls operation of respective sections of the image forming apparatus 100 through the processor reading and executing control programs stored in the storage 6. Specifically, the controller 5 controls the storage 6, the receiving section 42, and the display section 41.

The storage 6 includes a hard disk drive (HDD), a random access memory (RAM) device, and a read only memory (ROM) device. The storage 6 may further include external memory. The external memory is removable media. For example, the storage 6 may include universal serial bus (USB) memory and a secure digital (SD) card as the external memory. The storage 6 stores therein various data and the control programs for controlling operation of the respective sections of the image forming apparatus 100. The control programs are executed by the controller 5.

The communication section 7 is communicatively connected to various external terminal devices via a network. Examples of the network include a local area network (LAN), a wide area network (WAN), and a telephone line. Examples of the external terminal devices include a personal computer, a tablet terminal, and a facsimile machine. The communication section 7 receives and transmits various data from and to the external terminal devices via the network. Examples of the various data include read image data, print job data, email data, and facsimile data.

Figure 2:
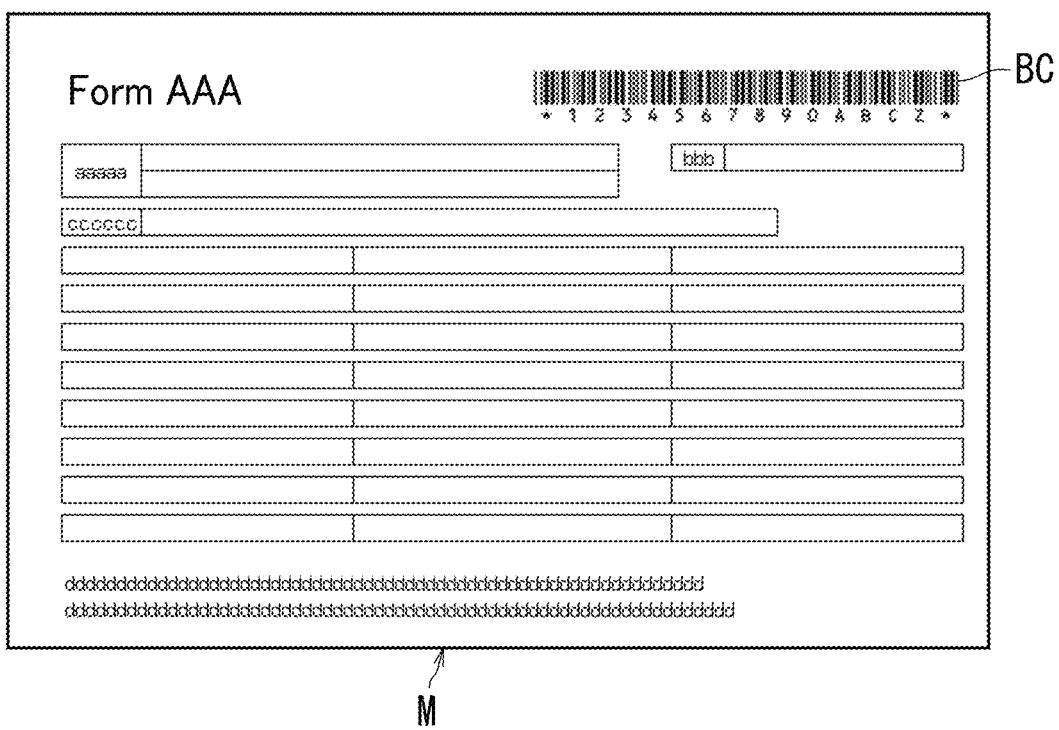
FIG. 2 is a diagram illustrating an example of a document image.

The following describes an example of a document image M with reference to FIG. 2. FIG. 2 is a diagram illustrating the example of the document image M. As illustrated in FIG. 2, the document image M includes a barcode image BC. The barcode image BC exhibits a barcode 13.

Figure 4:
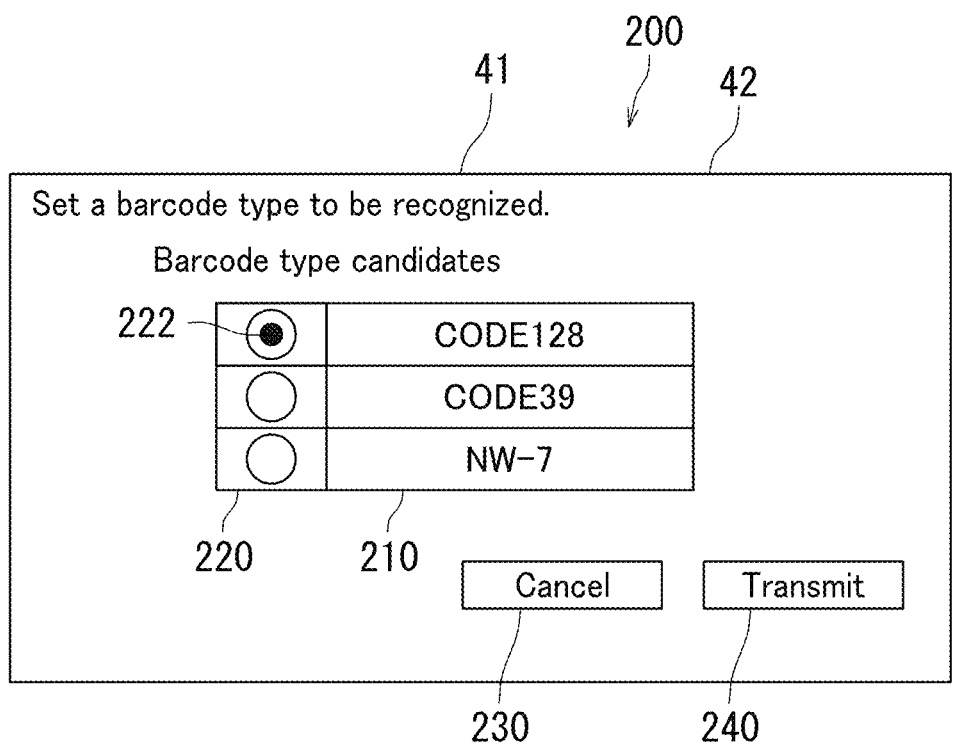
FIG. 4 is a diagram illustrating a display section.

The following further describes the image forming apparatus 100 according to the present embodiment with reference to FIGS. 1 to 4. FIG. 3 is a diagram illustrating barcode types and transmission destination information stored in the storage 6. FIG. 4 is a diagram illustrating the display section 41.

As illustrated in FIG. 3, the storage 6 stores therein a plurality of barcode types and designation information such that each of designation information items constituting the designation information is associated with any of the plurality of barcode types. Specifically, the storage 6 stores therein the plurality of barcode types and transmission destination information such that each of transmission destination information items constituting the transmission destination information is associated with any of the plurality of barcode types. For example, the storage 6 stores therein an email address "AAA@aaa.com" in association with a barcode type "CODE128".

Each time the image reading section 21 acquires a read image, the controller 5 causes the storage 6 to store therein a barcode type set in acquisition of the read image by the image reading section 21 in association with a designation information item. For example, when the email address "AAA@aaa.com" is set as a transmission destination and "CODE128" is set as a barcode type, the controller 5 causes the storage 6 to store therein the barcode type "CODE128" in association with the email address "AAA@aaa.com". Thus, a history of transmission destinations associated with respective barcode types is stored in the storage 6.

In reading the document image M, the image reading section 21 reads a barcode image BC corresponding to a barcode type set by the user. The user can set the barcode type by operating a setting screen 200 through the operation panel 4.

The following describes the setting screen 200 for barcode type setting with reference to FIG. 4. Before the image reading section 21 reads the document image M, the controller 5 causes the display section 41 to display the setting screen 200. The setting screen 200 includes a type candidate display section 210, a type selection section 220, a cancel button 230, and a transmission button 240.

The type candidate display section 210 displays barcode type candidates. The controller 5 causes the display section 41 to display one or more barcode types on the basis of a designation information item received by the receiving section 42. The one or more barcode types are associated with the designation information item. The designation information in the present embodiment is the transmission destination information. Specifically, the controller 5 causes the display section 41 to display one or more barcode types associated with a transmission destination set by the user among the barcode types stored in the storage 6. In this configuration, the type candidate display section 210 displays one or more barcode types set in the past when the same transmission destination was set.

The type selection section 220 indicates whether or not each barcode type is selected. The type selection section 220 is for example constituted by radio buttons. The user can select any of the barcode types displayed by the type candidate display section 210 by changing a selected position 222 in the type selection section 220 through the operation panel 4. Note that the user may select two or more barcode types when the document image M includes a plurality of barcode images.

The cancel button 230 is a button for canceling display of the setting screen 200. For example, when a barcode type that the user wants to set is not displayed by the type candidate display section 210, the user performs a touch operation on the cancel button 230 through the operation panel 4. In response to the touch operation, the controller 5 cancels display of the setting screen 200. That is, the controller 5 causes the display section 41 to display a screen other than the setting screen 200.

The transmission button 240 is a button for transmitting the read image. The user can transmit the read image through an operation on the operation panel 4. Specifically, in response to a touch operation performed on the transmission button 240 by the user, the controller 5 causes the image reading section 21 to acquire a read image by reading the document image M. At this time, the controller 5 causes the image reading section 21 to read a barcode image BC of a barcode type selected through the type selection section 220. The controller 5 then transmits the read image to the transmission destination.

Figure 5:
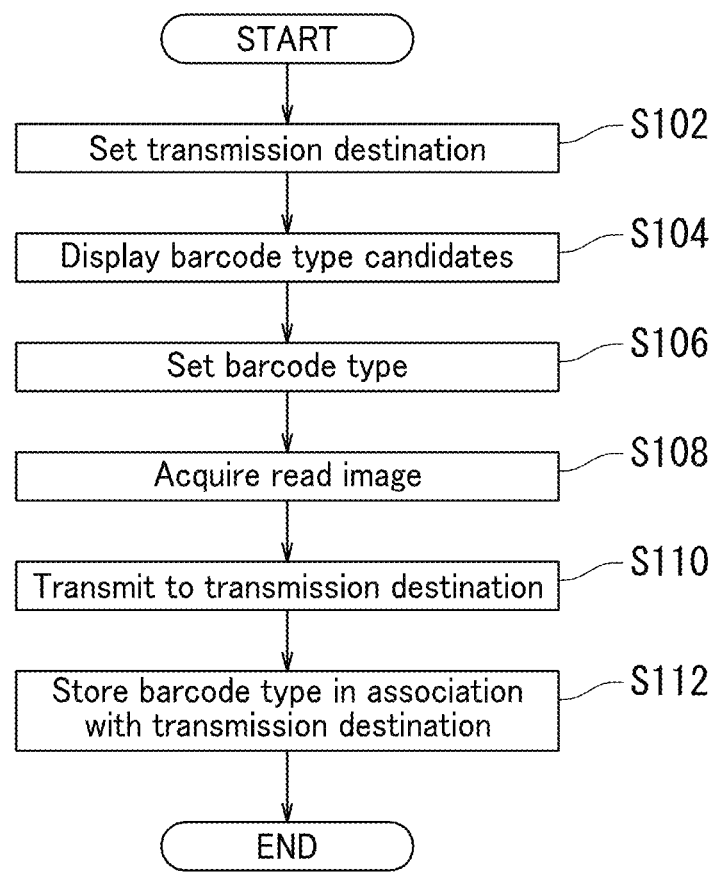
FIG. 5 is a flowchart illustrating an image reading method performed by an image reading unit according to the first embodiment of the present disclosure.

The following describes an image reading method performed by the image reading unit 2 according to the first embodiment of the present disclosure with reference to FIGS. 1 to 5. FIG. 5 is a flowchart illustrating the image reading method performed by the image reading unit 2 according to the first embodiment of the present disclosure. Processing from Step S102 to Step S112 illustrated in FIG. 5 is performed upon the document image M being read.

At Step S102, the controller 5 sets a transmission destination. Specifically, the receiving section 42 receives input of transmission destination information in response to an operation performed on the operation panel 4 by the user. The controller 5 then sets a transmission destination indicated by the transmission destination information as the transmission destination of a read image. The routine then proceeds to Step S104.

At Step S104, the controller 5 causes the display section 41 to display barcode type candidates. Specifically, the controller 5 causes the display section 41 to display the setting screen 200 (see FIG. 4) for barcode type setting. The routine then proceeds to Step S106.

At Step S106, the controller 5 sets a barcode type. Specifically, the receiving section 42 receives a barcode type upon selection of the barcode type by the user through the setting screen 200. The controller 5 then sets the barcode type selected by the user as the barcode type of a to-be-read barcode image BC. The routine then proceeds to Step S108.

At Step S108, the image reading section 21 acquires the read image by reading the document image M. Specifically, the image reading section 21 reads the barcode image BC corresponding to the barcode type set at Step S106. The routine then proceeds to Step S110.

At Step S110, the communication section 7 transmits the read image to the transmission destination. The routine then proceeds to Step S112.

At Step S112, the controller 5 causes the storage 6 to store therein the barcode type set at Step S106 in association with the transmission destination information. The processing ends then.

As described above with reference to FIGS. 1 to 5, the storage 6 stores therein the plurality of barcode types and the designation information such that each of the designation information items constituting the designation information is associated with any of the plurality of barcode types. Further, the controller 5 causes the display section 41 to display one or more barcode types on the basis of a designation information item received by the receiving section 42. The one or more barcode types are associated with the designation information item. That is, the controller 5 causes the display section 41 to display one or more barcode type candidates on the basis of a setting used in the past. Therefore, selection of a barcode type by the user is facilitated and convenience for the user is improved.

Furthermore, the designation information includes the transmission destination information indicating the transmission destination of the read image. That is, the controller 5 causes the display section 41 to display the one or more barcode type candidates on the basis of a transmission destination used in the past. It is highly likely that barcodes of the same type are used for the same transmission destination. Therefore, the controller 5 can cause the display section 41 to display barcode types, any of which is highly likely to be set, as the barcode type candidates.

Furthermore, each time the image reading section 21 acquires a read image, the controller 5 causes the storage 6 to store therein a barcode type set in acquisition of the read image by the image reading section 21 in association with a designation information item. Therefore, the controller 5 can cause the display section 41 to display the barcode type candidates on the basis of a selling used in the past.

Second Embodiment

The following describes the image forming apparatus 100 according to the second embodiment with reference to FIGS. 1, 2, 4, and 6. FIG. 6 is a diagram illustrating barcode types and department information stored in the storage 6. The second embodiment differs from the first embodiment in that designation information in the second embodiment is the department information. The following describes difference in the second embodiment from the first embodiment, and overlapping description of matter similar to that in the first embodiment will be omitted.

As illustrated in FIG. 6, the storage 6 stores therein a plurality of barcode types and designation information such that each of designation information items constituting the designation information is associated with any of the plurality of barcode types. Specifically, the storage 6 stores therein the plurality of barcode types and department information such that each of department information items constituting the department information is associated with any of the plurality of barcode types. For example, the storage 6 stores therein a department "department A" in association with the barcode type "CODE128".

Each time the image reading section 21 acquires a read image, the controller 5 causes the storage 6 to store therein a barcode type set in acquisition of the read image by the image reading section 21 in association with a designation information item. The controller 5 identifies a department on the basis of login information input by the user to log in to the image forming apparatus 100, for example. For example, when "CODE128" is set as the barcode type by a user belonging to the department A, the controller 5 causes the storage 6 to store therein the barcode type "CODE128" in association with the department "department A". Thus, a history of departments associated with respective barcode types is stored in the storage 6.

Similarly to the first embodiment, the controller 5 causes the display section 41 to display the setting screen 200 (see FIG. 4) before the image reading section 21 reads the document image M. The controller 5 causes the display section 41 to display one or more barcode types on the basis of a designation information item received by the receiving section 42. The one or more barcode types are associated with the designation information item. The designation information in the present embodiment is the department information. Specifically, the controller 5 causes the display section 41 to display one or more barcode types associated with the department to which the user belongs among the barcode types stored in the storage 6. In this configuration, the type candidate display section 210 displays barcode types set in the past by users belonging to the same department as the user.

Figure 7:
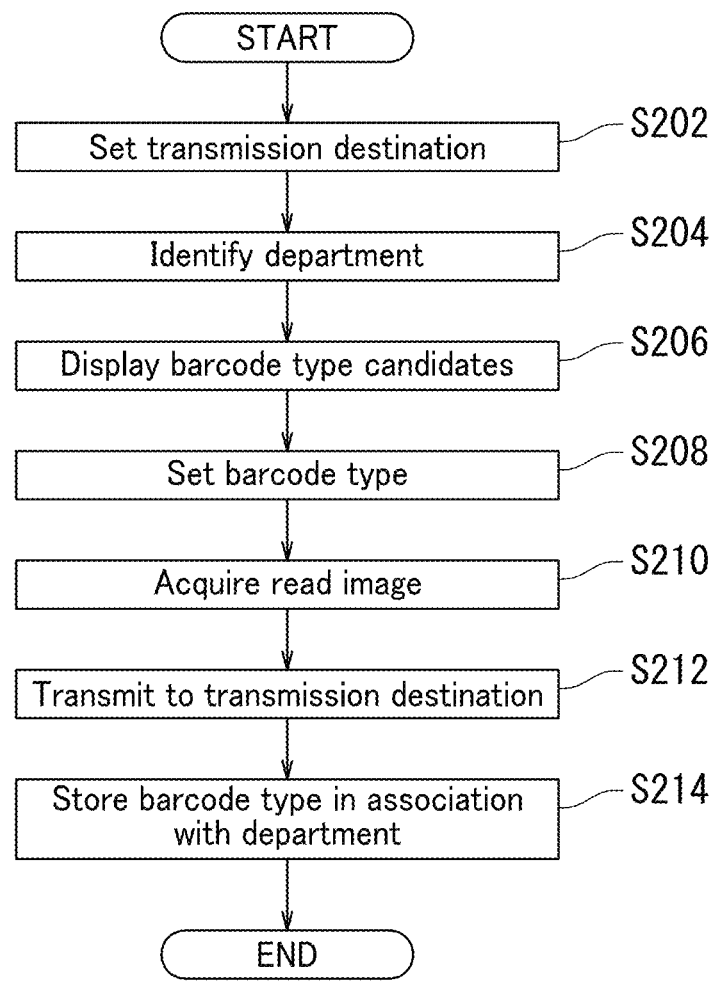
FIG. 7 is a flowchart illustrating an image reading method performed by the image reading unit according to the second embodiment of the present disclosure.

The following describes an image reading method performed by the image reading unit 2 according to the second embodiment of the present disclosure with reference to FIGS. 1, 2, 4, 6, and 7. FIG. 7 is a flowchart illustrating the image reading method performed by the image reading unit 2 according to the second embodiment of the present disclosure. Processing from Step S202 to Step S214 illustrated in FIG. 7 is performed upon the document image M being read. Since Steps S202 and S206 to S212 are similar to Steps S102 to S110 illustrated in FIG. 5, overlapping description will be omitted.

At Step S204, the controller 5 identifies a department to which the user operating the image forming apparatus 100 belongs. The controller 5 identifies the department on the basis of login information input by the user to log in to the image forming apparatus 100, for example.

At Step S214, the controller 5 causes the storage 6 to store therein a barcode type set at Step S208 in association with the department information.

In the present embodiment, the designation information is the department information that indicates the department to which the user belongs. The controller 5 causes the display section 41 to display barcode type candidates on the basis of barcode types set in the past by users belonging to the same department as the user. It is highly likely that users belonging to the same department use barcodes of the same type. Therefore, the controller 5 can cause the display section 41 to display barcode types, any of which is highly likely to be set, as the barcode type candidates.

Third Embodiment

The following describes the image forming apparatus 100 according to the third embodiment with reference to FIGS. 1, 2, 4, and 8. FIG. 8 is a diagram illustrating barcode types and size information stored in the storage 6. The third embodiment differs from the first and second embodiments in that designation information in the third embodiment is the size information. The following describes difference in the third embodiment from the first and second embodiments, and overlapping description of matter similar to that in the first and second embodiments will be omitted.

As illustrated in FIG. 8, the storage 6 stores therein a plurality of barcode types and designation information such that each of designation information items constituting the designation information is associated with any of the plurality of barcode types. Specifically, the storage 6 stores therein the plurality of barcode types and size information such that each of size information items constituting the size information is associated with any of the plurality of barcode types. The size information indicates the size of the document image M. For example, the storage 6 stores therein a size "size A" in association with the barcode type "CODE128".

Each time the image reading section 21 acquires a read image, the controller causes the storage 6 to store therein a barcode type set in acquisition of the read image by the image reading section 21 in association with a designation information item. For example, the controller 5 causes the storage 6 to store therein the barcode type "CODE128" in association with the size "size A". Thus, a history of sizes of document images M associated with respective barcode types is stored in the storage 6.

Similarly to the first and second embodiments, the controller 5 causes the display section 41 to display the setting screen 200 (see FIG. 4) before the image reading section 21 reads the document image M. The controller 5 causes the display section 41 to display one or more barcode types on the basis of a designation information item received by the receiving section 42. The one or more barcode types are associated with the designation information item. The designation information in the present embodiment is the size information. Specifically, the controller 5 causes the display section 41 to display one or more barcode types associated with the size of the document image M among the barcode types stored in the storage 6. In this configuration, the type candidate display section 210 displays barcode types set in the past upon document images M of the same size as the to-be-read document image M being read.

Figure 9:
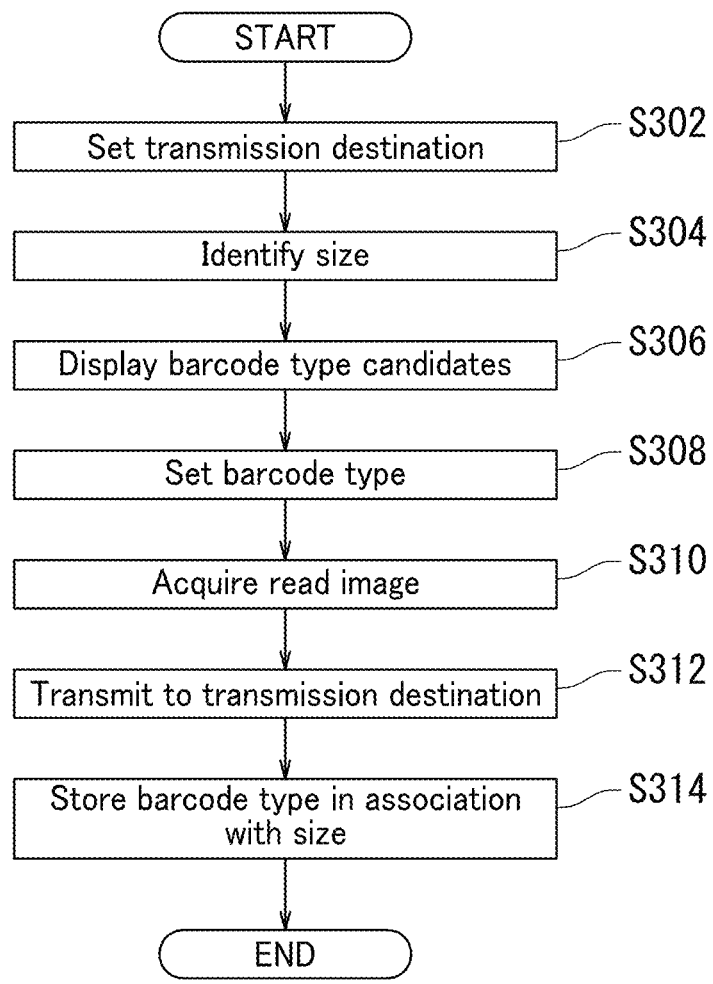
FIG. 9 is a flowchart illustrating an image reading method performed by the age reading unit according to the third embodiment of the present disclosure.

The following describes an image reading method performed by the image reading unit 2 according to the third embodiment of the present disclosure with reference to FIGS. 1, 2, 4, 8, and 9. FIG. 9 is a flowchart illustrating the image reading method performed by the image reading unit 2 according to the third embodiment of the present disclosure. Processing from Step S302 to Step S314 illustrated in FIG. 9 is performed upon the document image M being read. Since Steps S302 and S306 to S312 are similar to Steps S102 to S110 illustrated in FIG. 5, overlapping description will be omitted.

At Step S304, the controller 5 identifies a size of the document image M. The controller 5 identifies a size of the document image M designated by the user through the operation panel 4 as the size of the document image M, for example.

At Step S314, the controller 5 causes the storage 6 to store therein a barcode type set at Step S308 in association with the size information.

In the present embodiment, the designation information is the size information indicating the size of the document image M. The controller 5 causes the display section 41 to display barcode type candidates on the basis of barcode types set in the past upon document images M of the same size as the to-be-read document image M being read. It is highly likely that barcodes of the same type are used in document images M of the same size. Therefore, the controller 5 can cause the display section 41 to display barcode types, any of which is highly likely to be set, as the barcode type candidates.

Preferably, the storage 6 further stores therein a set count for each of the barcode types. The set count indicates how many times the barcode type has been set in read image acquisition. FIG. 10 is a diagram illustrating barcode types and set counts stored in the storage 6.

As illustrated in FIG. 10, the storage 6 stores therein set counts for respective barcode types. Each of the set counts indicates how many times a corresponding barcode type has been set in read image acquisition. For example, the set count for the barcode type "CODE128" is 35.

The controller 5 causes the display section 41 to display one or more barcode types on the basis of set counts.

Specifically, the controller 5 causes the display section 41 to display one or more barcode type candidates on the basis of the set counts. More specifically, the controller 5 causes the display section 41 to display the barcode type candidates so as to be arranged in descending order of their respective set counts. For example, the controller 5 causes the display section 41 to display barcode types "CODE128", "CODE39", and "NW-7" as the barcode type candidates arranged in this order as illustrated in FIG. 4.

Alternatively, the controller 5 may cause the display section 41 to display barcode types having set counts equal to or higher than a specific count among the plurality of barcode types. The specific count is for example 10. The controller 5 causes the display section 41 to display the barcode types "CODE128", "CODE39", and "NW-7" having respective set counts equal to or higher than 10 as the barcode type candidates as illustrated in FIG. 4.

Preferably, the storage 6 further stores therein barcode digit numbers in association with barcode types. A barcode digit number indicates the number of digits constituting a barcode of a corresponding barcode type. FIG. 11 is a diagram illustrating barcode types and barcode digit numbers stored in the storage 6. The controller 5 causes the display section 41 to display one or more barcode types on the basis of barcode digit numbers. Specifically, the controller 5 causes the display section 41 to display one or more barcode type candidates on the basis of the barcode digit numbers. For example, the user sets a barcode digit number through the operation panel 4. The controller 5 causes the display section 41 to display barcode types associated with the barcode digit number set by the user as the barcode type candidates. For example, when 13 is set as the barcode digit number, the controller 5 causes the display section 41 to display barcode types "CODE128" and "JAN" associated with the barcode digit number of 13 as the barcode type candidates.

Figure 12:
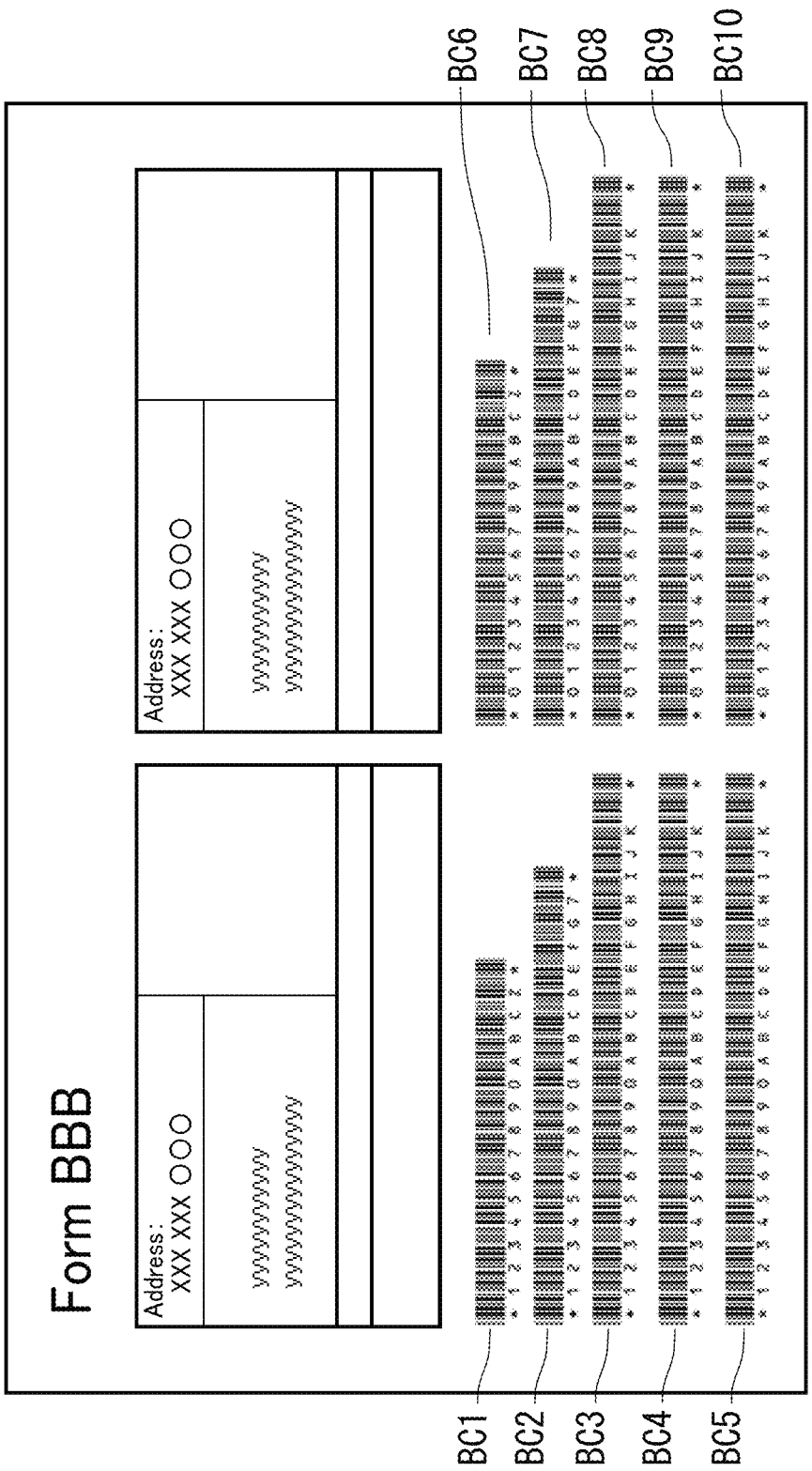
FIG. 12 is a diagram illustrating another example of the document image.

Note that the document image M may include a plurality of barcode images. FIG. 12 is a diagram illustrating another example of the document image M. As illustrated in FIG. 12, the document image M includes a plurality of barcode images BC. The barcode images BC include barcode images BC1 to BC10. The barcode images BC1 to BC10 respectively exhibit barcodes B1 to B10.

The barcodes B1 to B10 include barcodes of different types. Specifically, the type of the barcodes B1 and B6 is "NW-7". The type of the barcodes B2 and B7 is "CODE39". The type of the barcodes B3 to B5 and B8 to B10 is "CODE128".

When the document image NI includes a plurality of barcode images BC that exhibit barcodes of different types, the controller 5 causes the display section 41 to display barcode type candidates in descending order of the numbers of times of reading of the respective barcode types. Specifically, the controller 5 determines whether or not specific conditions are satisfied, and causes, when determining that the specific conditions are satisfied, the display section 41 to display barcode types in descending order of the numbers of times of reading of the respective barcode types. The specific conditions are the followings. That is, the number of barcode images included in the document image M is equal to or larger than a first threshold and the number of barcode types of barcodes exhibited by the respective barcode images included in the document image M is equal to or larger than a second threshold. The first threshold is for example 10. The second threshold is for example 3. That is, when the number of barcode images BC included in the document image M is equal to or larger than 10 and the number of barcode types is equal to or larger than 3, the controller 5 causes the display section 41 to display barcode type candidates in descending order of the numbers of times of reading of the respective barcode types.

Through the above, the embodiments of the present disclosure have been described with reference to the drawings (FIGS. 1 to 12). However, the present disclosure is not limited to the above embodiments, and can be practiced in various manners within a scope not departing from the gist of the present disclosure (for example, as described below in (1) to (3)). The drawings schematically illustrate elements of configuration to facilitate understanding. Properties of the elements of configuration, such as thickness, length, and the number thereof, illustrated in the drawings may differ from actual properties thereof to facilitate preparation of the drawings. Also, material, shape, dimensions and the like of elements of configuration described in the above embodiments are merely examples and are not intended as specific limitations. Various alterations can be made within a scope not substantially departing from the effects of the present disclosure.

(1) Although the image forming apparatus 100 is a color multifunction peripheral in the embodiments of the present disclosure as described above with reference to FIG. 1, the present disclosure is not limited as such. The image forming apparatus 100 may for example be a scanner or a monochrome copier.

(2) Although the barcode B described above with reference to FIGS. 1, 2, and is a one-dimensional barcode, the present disclosure is not limited as such. It is only required that the barcode B be either a one-dimensional barcode or a two-dimensional barcode. For example, the barcode B may be a two-dimensional barcode. An example of two-dimensional barcodes is a QR (Quick Response) Code (registered Japanese trademark).

(3) Although the designation information is the transmission destination information in the first embodiment, the department information in the second embodiment, and the size information of the document image M in the third embodiment, the present disclosure is not limited as such. For example, the designation information may be a combination of at least two of the transmission destination information, the department information, and the size information of the document image M.

What is claimed is:

1. An image reading device comprising:
   storage storing therein a plurality of barcode types and designation information items, each of the designation information items being associated with any of the plurality of barcode types;
   an image reading section configured to acquire a read image by reading a document image including a barcode image;
   a receiving section configured to receive input of a designation information item among the designation information items;
   a display section configured to display one or more barcode types among the plurality of barcode types; and
   a controller configured to control the storage, the receiving section, and the display section, wherein
   the barcode image exhibits a barcode belonging to any of the one or more barcode types,
   the controller causes the display section to display the one or more barcode types on the basis of the designation information item received by the receiving section, the one or more barcode types being associated with the designation information item, the storage further stores therein set counts for the respective barcode types, each of the set counts indicating how many times a corresponding barcode type has been set in read image acquisition, and the controller causes the display section to display the one or more barcode types on the basis of respective set counts of the one or more barcode types.

2. The image reading device according to claim 1, wherein
the designation information items include a transmission destination information item indicating a transmission destination of the read image.

3. The image reading device according to claim 1, wherein
the designation information items include a department information item indicating a department to which a user belongs.

4. The image reading device according to claim 1, wherein
the designation information items include a size information item indicating a size of the document image.

5. The image reading device according to claim 1, wherein
each time the image reading section acquires a read image, the controller causes the storage to store therein a barcode type set in acquisition of the read image by the image reading section in association with the designation information item.

6. The image reading device according to claim 1, wherein
the controller causes the display section to display the one or more barcode types in descending order of the respective set counts of the one or more barcode types.

7. The image reading device according to claim 1, wherein
the one or more barcode types displayed by the display section have set counts equal to or higher than a specific count.

8. The image reading device according to claim 1, wherein
the storage further stores therein barcode digit numbers in association with the respective barcode types, each of the barcode digit numbers indicating the number of digits constituting a barcode belonging to a corresponding barcode type, and the controller causes the display section to display the one or more barcode types on the basis of respective barcode digit numbers of the one or more barcode types.

9. An image reading device comprising:
storage storing therein a plurality of barcode types and designation information items, each of the designation information items being associated with any of the plurality of barcode types;

an image reading section configured to acquire a read image by reading a document image including a barcode image;

a receiving section configured to receive input of a designation information item among the designation information items;

a display section configured to display one or more barcode types among the plurality of barcode types; and a controller configured to control the storage, the receiving section, and the display section, wherein the barcode image exhibits a barcode belonging to any of the one or more barcode types, the controller causes the display section to display the one or more barcode types on the basis of the designation information item received by the receiving section, the one or more barcode types being associated with the designation information item, the controller determines whether or not specific conditions are satisfied, and when determining that the specific conditions are satisfied, the controller causes the display section to display barcode types among the plurality of barcode types in descending order of the numbers of times of reading of the respective barcode types, the specific conditions being satisfied when the number of barcode images included in the document image is equal to or larger than a first threshold and the number of barcode types of barcodes exhibited by the respective barcode images included in the document image is equal to or larger than a second threshold.

10. The image reading device according to claim 9, wherein
the designation information items include a transmission destination information item indicating a transmission destination of the read image.

11. The image reading device according to claim 9, wherein
the designation information items include a department information item indicating a department to which a user belongs.

12. The image reading device according to claim 9, wherein
the designation information items include a size information item indicating a size of the document image.

13. The image reading device according to claim 9, wherein
each time the image reading section acquires a read image, the controller causes the storage to store therein a barcode type set in acquisition of the read image by the image reading section in association with the designation information item.

14. The image reading device according to claim 9, wherein
the controller causes the display section to display the one or more barcode types in descending order of the respective set counts of the one or more barcode types.

15. The image reading device according to claim 9, wherein
the one or more barcode types displayed by the display section have set counts equal to or higher than a specific count.

16. The image reading device according to claim 9, wherein
the storage further stores therein barcode digit numbers in association with the respective barcode types, each of the barcode digit numbers indicating the number of digits constituting a barcode belonging to a corresponding barcode type, and the controller causes the display section to display the one or more barcode types on the basis of respective barcode digit numbers of the one or more barcode types.

17. An image reading method comprising:
storing a plurality of barcode types and designation information items, each of the designation information items being associated with any of the plurality of barcode types;

acquiring a read image by reading a document image including a barcode image;

receiving input of a designation information item among the designation information items; and displaying one or more barcode types among the plurality of barcode types on the basis of the received designation information item, the one or more barcode types being associated with the received designation information item, wherein the barcode image exhibits a barcode belonging to any of the one or more barcode types, in the storing, set counts for the respective barcode types are further stored, each of the set counts indicating how many times a corresponding barcode type has been set in read image acquisition, and in the displaying, the one or more barcode types are displayed on the basis of respective set counts of the one or more barcode types.

* * * * *